Figure 1:
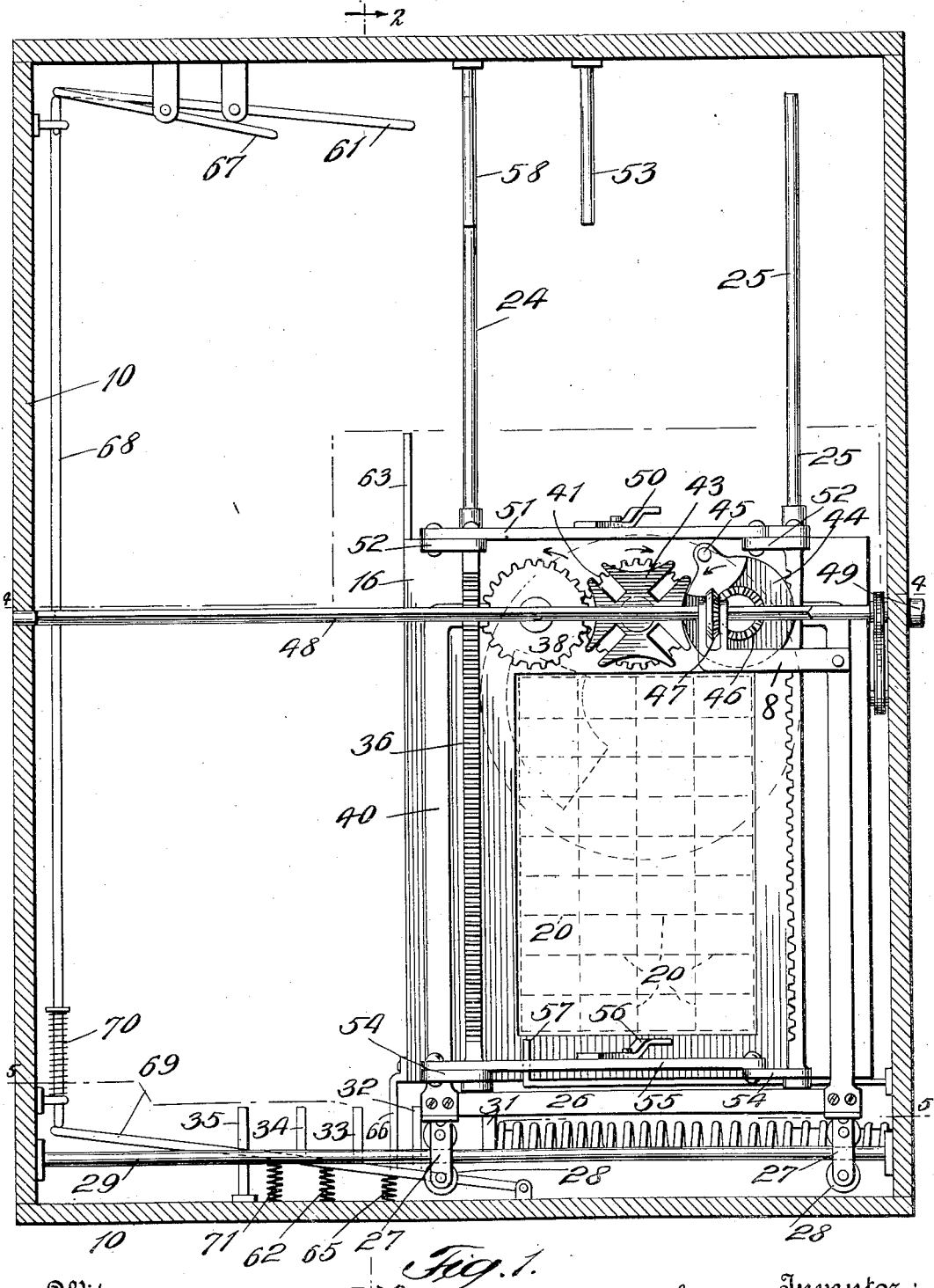

E. L. OPPENHEIMER.
MOTION PICTURE MACHINE.
APPLICATION FILED AUG. 4, 1914.

1,177,797.

Patented Apr. 4, 1916.
4 SHEETS—SHEET 1.

E. L. OPPENHEIMER.
MOTION PICTURE MACHINE.
APPLICATION FILED AUG. 4, 1914.

1,177,797.

Patented Apr. 4, 1916.
4 SHEETS—SHEET 2.

E. L. OPPENHEIMER.
MOTION PICTURE MACHINE.
APPLICATION FILED AUG. 4, 1914.

1,177,797.

Patented Apr. 4, 1916.
4 SHEETS—SHEET 4.

Witnesses:

Inventor:
Edwin L. Oppenheimer,
By his Attorney,
Charles C. Gill.

UNITED STATES PATENT OFFICE.

EDWIN L. OPPENHEIMER, OF NEW YORK, N. Y.

MOTION-PICTURE MACHINE.

1,177,797.   Specification of Letters Patent.   Patented Apr. 4, 1916.

Application filed August 4, 1914. Serial No. 854,916.

*To all whom it may concern:*

Be it known that I, EDWIN L. OPPENHEIMER, a citizen of the United States, and a resident of New York city, in the county of New York and State of New York, have invented certain new and useful Improvements in Motion-Picture Machines, of which the following is a specification.

One of the purposes of my invention is to provide a combined camera and projector which a person of moderate means may purchase and utilize for the pleasure of himself and friends in taking moving pictures and projecting them.

In the camera of my invention I provide a film or plate-holder which is capable of having uniform step-by-step vertical and lateral movements imparted to it whereby definite successive sections of the plate or sheet-film carried by the holder may pass into exposure position in line with the lens and receive the impressions, my invention providing means whereby the holder for the plate or film may have its vertical and lateral step-by-step movements very rapidly imparted to it so that an object in motion may have a series of rapidly taken successive impressions made of it, and which impressions, when developed, would constitute in effect a series of moving pictures and when rapidly projected would represent the object in motion. I contemplate taking about thirty-six impressions of small size on each plate or film of about two inches by three inches during one travel of the plate or film holder through its successive movements exposing the plate or film at the successive sections thereof. The thirty-six impressions may be quickly made of a single object in motion and when developed may be projected or enlarged prints may be prepared from the small impressions, and these prints may be utilized to represent moving pictures by placing them in a pack in successive order and binding one edge of the pack, and then snapping the opposite edge of the layers of the pack between the thumb and finger to cause the leaves of the pack to spring open. I mention taking thirty-six impressions on a small plate or sheet film merely as a matter of illustration and not as limiting my invention to the taking of any special number of impressions during one cycle of movement of the plate or film holder. The number of impressions to be taken during each cycle of movement of the plate or film holder will depend upon the size of the plate or film and the holder and the general size of the various parts of the camera and I contemplate making the cameras in various sizes so that any desired number of impressions may be taken during each cycle of movement of the plate or film holder.

Figure 2:
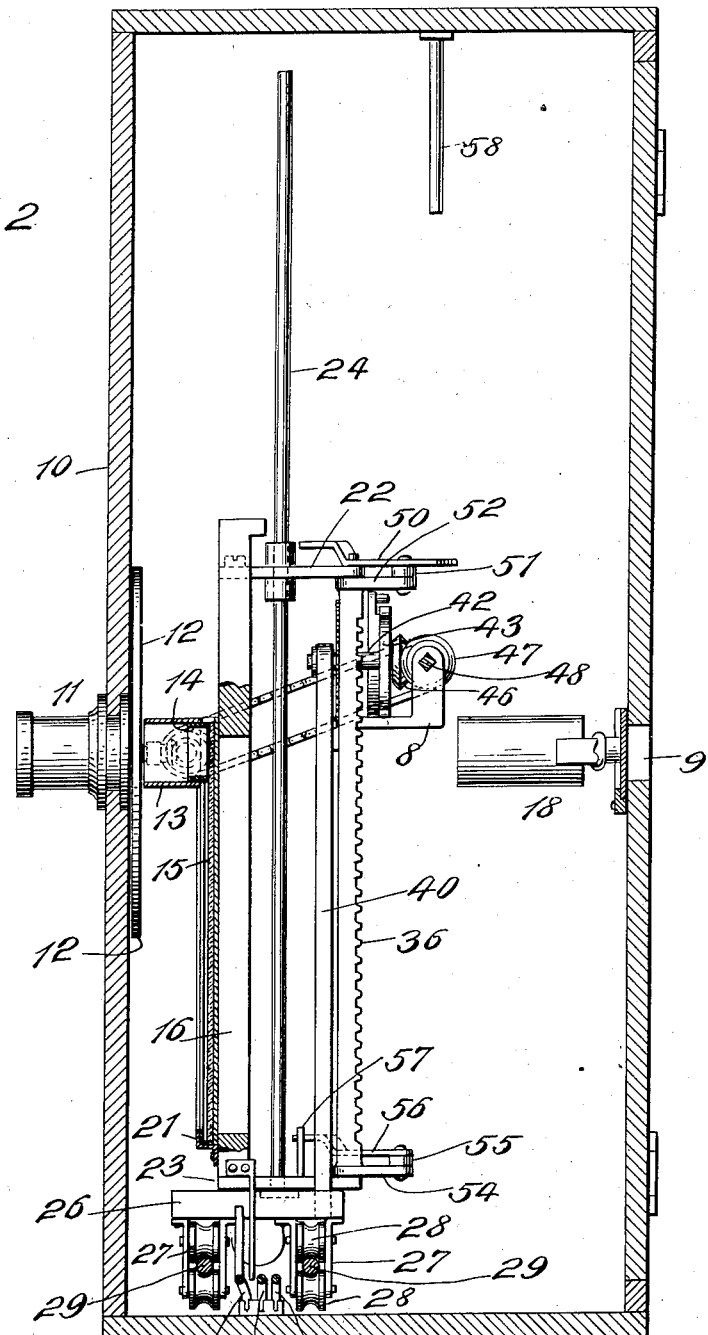
Figure 3:
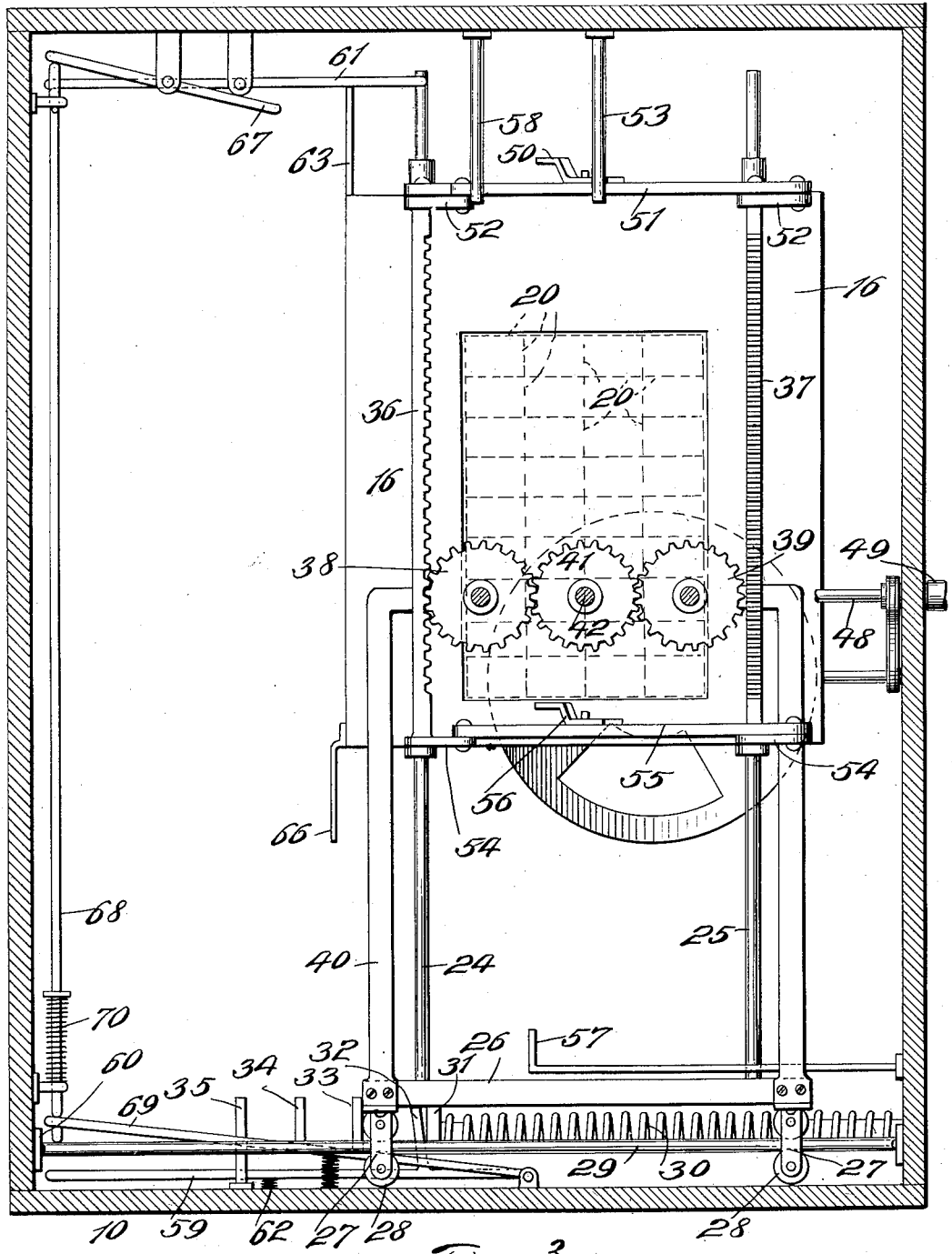
Figure 4:
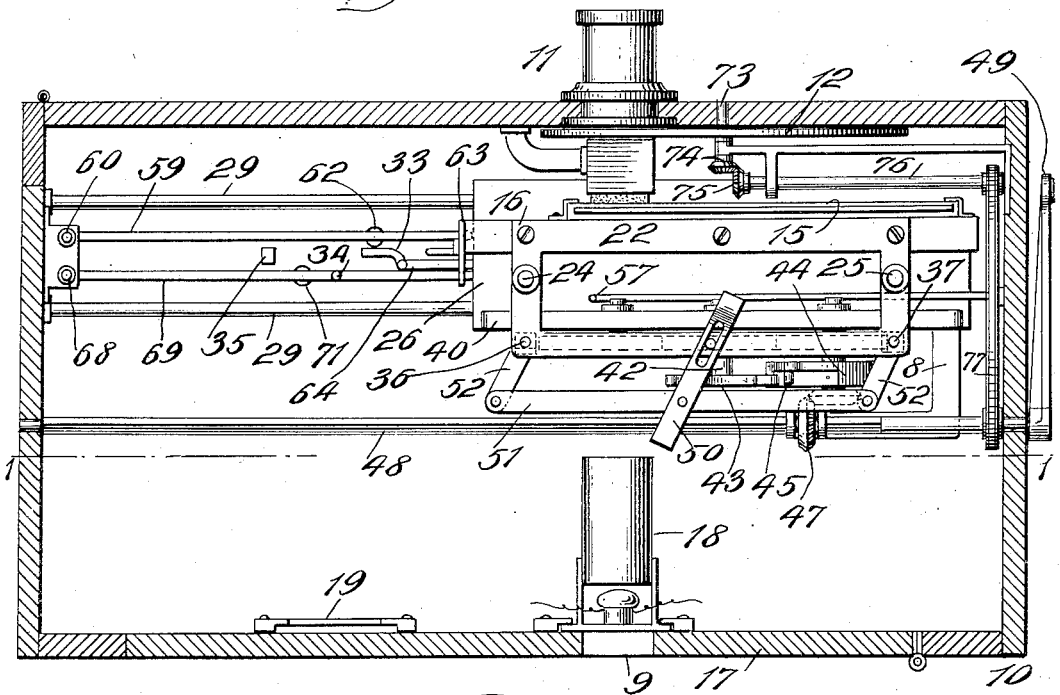
Figure 5:
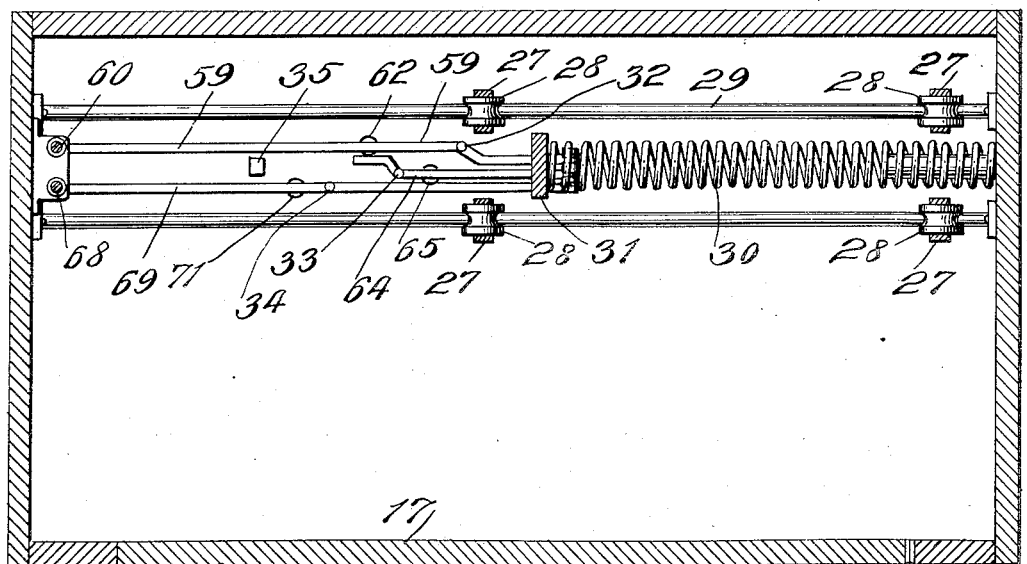

The invention will be fully understood from the detailed description hereinafter presented, reference being had to the accompanying drawings, in which:

Figure 1 is a vertical section through the casing of the camera, taken about on the dotted line 1—1 of Fig. 4, and illustrates the interior mechanism of the camera in its initial position ready for operation; Fig. 2 is a vertical section through the same, partly broken away, on the dotted line 2—2 of Fig. 1; Fig. 3 is a view substantially corresponding with the section of Fig. 1, but illustrating the interior mechanism as having been in operation, the plate holder having been shifted vertically and laterally toward the left in the performance of its duty in presenting successive step by step portions of the plate or film to exposure position; in Fig. 3 the Geneva movement shown in Fig. 1 has been cut away and the two vertical rack bars have been shown in a position reverse to that illustrated in Fig. 1; Fig. 4 is a horizontal section through the camera taken about on the dotted line 4—4 of Fig. 1, and Fig. 5 is a horizontal section through the camera taken about on the dotted line 5—5 of Fig. 1.

In the drawings, 10 designates the general box or casing of the camera and this will be of any suitable form and construction; at the rear side of the box will be provided a suitable lens 11 and shutter 12, these features not being of unusual form or construction. Adjacent to the shutter 12 and in the chamber formed by the casing 10 is a tube 13 containing at its inner end a felt or other light-excluding ring 14, this tube being in line with the lens 11 and terminating in close relation to a plate or film 15 carried by a plate or film holder 16 of rectangular outline and constituting one of the features of my invention. At the front of the general casing 10 is provided a door 17 upon which may be placed a lamp and projecting lens 18 when the camera is to be used as a projector and upon the said door 17 I arrange a bracket 19 for supporting the projecting lens and lamp when the same are not in use, such as when the camera is being used for taking impressions.

The projecting lens and lamp constitute no special part of my invention, but I provide the same within the camera so that the apparatus may be used both for taking impressions and making projections, the apparatus being thereby rendered more useful to individuals and families. The door 17 may have an opening 9 for use when focusing.

My purpose is to take any suitable number of successive impressions, in rapid order upon the plate or film sheet 15 carried by the holder 16, and in Figs. 1 and 3 I indicate by the dotted lines 20 the order in which the impressions will be taken on the plate or film 15, the latter usually being, when to receive thirty-six impressions, about two inches by three inches in dimensions, so that upon the same there may be taken four vertical rows of impressions, with nine impressions in a row.

The plate holder 16 is a rectangular frame having thereon a receiver 21 of any ordinary or suitable character for a plate or sheet-film. The frame 16 may be made of wood or other suitable material, and it has secured to its upper and lower ends respectively plates 22, 23 mounted freely on vertical guide rods 24, 25, which are connected at their lower ends with a carriage 26. The guide rods 24, 25 permit the frame 16 to have vertical movements and by the lateral movement of the carriage 26 said frame 16 may also have imparted to it lateral movements. The vertical movements of the frame 16 are arranged to be in successive intermittent order so that a column of spaces on the plate or sheet-film, indicated by the dotted lines 20, may, for illustration, be moved upwardly, step-by-step, in line with the exposure opening, and then when the said frame is shifted laterally the width of one column of said spaces, it may be moved downwardly step-by-step, and then when the frame is again shifted equal to the width of another column of said spaces, it may be moved upwardly step-by-step across the exposure opening, and then when shifted laterally again a distance equal to the width of one column of the spaces, it may be moved downwardly step-by-step to carry the spaces of the final column on the plate or film across the exposure opening, this series or cycle of movements being effected in rapid order by my invention and resulting in a predetermined number of impressions being taken on a single plate or film.

The carriage 26 has, upon its lower side, frames or hangers 27 in which grooved rollers 28 are mounted and which rollers, in pairs, closely engage track-rails 29 extending from one side to the other of the general casing 10. The rails 29 are plain metal rods and serve to guide the carriage 26 laterally or from one side toward the other of the general casing 10.

Interposed between the track-rails 29 is a coiled spring 30, and this spring is normally compressed between a depending stop 31 secured to the carriage 26 and the right hand side of the general casing 10. The spring 30 exerts a normal tendency to shift the carriage 26 toward the left and is resisted and controlled in its action at proper intervals by stops 32, 33, 34, 35, respectively (Fig. 1), these stops normally being in line with the bed plate of the carriage and with the exception of the stop 35, being at the proper time, one after another, displaced so as to permit the spring 30 to move the carriage and with it the rods 24, 25 and frame 16 a distance equal to the width of one of the columns of spaces, represented by the dotted line 20, intended for the plate or film.

If we consider the camera in its initial condition shown in Fig. 1 it will be seen that the stop 32 is holding the carriage 26 against the stress of the spring 30, and at this time the frame 16 may travel upwardly by a step-by-step movement to carry the first left hand column of spaces, represented by the dotted lines 20, across the exposure opening of the camera, and that then when the stop 32 is displaced in the manner hereinafter to be described, the spring 30 may shift the carriage 26 to position against the stop 33, thus bringing the second column of spaces at its lower end in line with the exposure opening and to be moved downwardly across said opening, and that then when the stop 33 has been displaced the spring 30 may shift the carriage 26 another definite distance or space to the left and against the stop 34, thus bringing the third column of spaces at its lower end in line with and to be moved downwardly across the exposure opening, and that thereafter when the frame 16 has again attained its upper portion the displacement of the stop 34 will permit the spring 30 to shift the carriage 26 to its last position or against the stop 35, thus carrying the fourth row of spaces on the plate or film in line with the exposure opening. The stops 32, 33, 34, 35 thus serve to limit and control the intermittent movements of the carriage 26 and are spaced apart to correspond with the columns of impressions to be taken on the plate or film. If we consider Fig. 1 as showing the initial position of the frame 16, it will be understood that the first or left hand column of impressions is to be taken on the sensitized plate or sheet-film and that at this time, with the stop 32 holding the carriage 26 stationary, the frame 16 is by a step-by-step movement caused to travel upwardly on the rods 24, 25 to carry the successive spaces of the left hand column of spaces on the plate or film to exposure position, and that immediately thereafter the stop 32 is displaced, allowing the carriage 26 to be moved against the stop 33 and bring the lower space of the second column of spaces to exposure position, and that the frame 16 is then forced to descend by a step-by-step movement to carrying the successive spaces of the second column thereof across the exposure opening, and that immediately thereafter the stop 33 becomes displaced to allow the carriage 26 to carry the third column of spaces in line with the exposure opening with the upper one of said spaces in exposure position and that then the frame 16 is caused to ascend on the rods 24, 25 to carry the successive spaces of the third column to exposure position, and finally, when the lower space of the third column has reached the exposure opening, the stop 34 becomes displaced and the spring 30 moves the carriage 26 to and against the stop 35, thus permitting the fourth column of spaces to pass into proper relation to the exposure opening with the bottom space of said column in line with said opening, whereupon the frame 16 descends on the rods 24, 25 by a step-to-step movement and carries the successive spaces of the fourth column into exposure position, the frame 16 when reaching its lower position having completed one entire cycle of movements by which the plate or film received all of the impressions it was capable of receiving, and thereupon the plate or film may be removed as usual for developing and the carriage 26 restored to its initial position shown in Fig. 1, ready to receive another sensitized plate or sheet-film.

The means for effecting the vertical movements of the frame 16 carrying the sensitized plate or film and the means for displacing the stops 32, 33, 34, one after another in harmony with the vertical movements of the frame 16, are features of my invention and will now be described. The plates 22, 23 carried by the frame 16 have pivotally mounted in them the upper and lower ends of vertical rack bars 36, 37, these rack bars having rack teeth of ordinary character and always extending at right-angles to each other, that is to say the teeth of the rack bar 36 will always stand at an angle to the teeth of the rack bar 37, either as shown in Fig. 1 or as shown in Fig. 3. The rack bar 36, as shown in Fig. 1, is out of operative position and the rack bar 37 shown in Fig. 1 is in operative position to coöperate with the gearing shown in effecting the ascent of the frame 16 on the rods 24, 25. When the frame 16 is to descend the rack bar 37 is turned out of operative position and the rack bar 36 into operative position, as shown in Fig. 3, so that said rack bar 36 may coöperate with the gearing shown in effecting the descent or downward travel of the frame 16.

The rack bars 36, 37 coöperate with gear wheels 38, 39 mounted upon shafts held in the upper end of a standard 40 secured to the carriage 26, and between the gear wheels 38, 39 is a corresponding transmitting gear wheel 41 also mounted on a shaft carried by said standard 40, the gear wheels 38, 39, 41 being in permanent mesh with one another in series. Upon the front end of the shaft 42 for the gear wheel 41 is mounted a star wheel of Geneva type 43, and this star wheel is engaged by a plain disk or wheel 44 carrying the customary pin 45 of Geneva movements for engagement with the star wheel 43. The disk or wheel 44 is loose on the shaft of the gear wheel 39 and rigid therewith is provided a beveled gear wheel 46 which is in mesh with a beveled gear wheel 47 on a driving shaft 48 which extends across the camera casing and is provided on its outer end with an operating crank 49. During the rotation of the shaft 48 by means of the crank 49 the beveled gear wheel 47 imparts motion to the bevel gear wheel 46 and disk 44 and through the pin 45 and star wheel 43 to the shaft 42 of the gear wheel 41 and to said gear wheel, said gear wheel 41 being a driven gear for driving both of the gear wheels 38, 39. The gear wheel 41 and consequently the gear wheels 38, 39 have an intermittent timed motion imparted to them due to the presence of the star wheel 43 and operating pin 45, and hence the gear wheels 38, 39 will have an intermittent motion when in coöperation with the rack bars 36, 37 to move the frame 16 vertically. The gear wheel 47 is slidable on the shaft 48 and is moved by a forked arm 8 secured to the standard 40. When the frame 16 is in its lower initial position shown in Fig. 1, the gear wheel 39 will be in mesh with the rack bar 37 since at that time the teeth of the rack bar are in line with the teeth of said gear wheel, and at this time the gear wheel 38 will rotate idly because of the rack bar 36 having been turned to carry its teeth from the teeth of said gear wheel. Upon the rotation of the driving shaft 48 with the frame 16 in its initial position shown in Fig. 1, said frame is, by the engagement of the gear wheel 39 with the rack bar 37, carried upwardly by a step-by-step movement, and then shifted laterally, as hereinbefore explained, and caused to descend by a step-by-step movement due to the then engagement of the rack bar 36 with the gear wheel 38. When the frame 16 reaches its upper position the arm 50 carried thereby and pivotally connected by a link 51 with lever arms 52 secured to the upper ends of the bars 36, 37, passes closely along the left hand side of a depending arm 53 and the resistance offered by this arm when the carriage 26 is shifted by the spring 30, as hereinafter explained, acts to shift said arm 50 and link 51 laterally toward the right, looking at Figs. 1 and 4, to the position shown in Fig. 3, and in doing so the lever arms 52 impart a quarter angular turn to the rack bars 36, 37, turning the teeth of the rack bar 37 away from the teeth of the gear wheel 39 and the teeth of the rack bar 36 into mesh with the teeth of the gear wheel 38, and thereupon the continued rotation of the shaft 48 results in the gear wheel 38, acting through the rack bar 36, causing the frame 16 to descend by a step-by-step movement. The lower ends of the rack bars 36, 37 also have lever arms 54 connected with them, and these lever arms are connected by a link 55 upon which is a lever arm 56, the parts 54, 55, 56 for the lower ends of the rack bars corresponding with the parts 52, 51, 50 connected with the upper ends of the rack bars. Upon the descent of the frame 16 the lever arm 56 passes closely along the right hand side of an upwardly extending arm 57 and this results, when the carriage 26 is shifted by the spring 30 in the manner hereinafter explained, in the link 55 being shifted to the left, looking at Fig. 3, and, through the lever arms 54, turning the rack bars from the position shown in Fig. 3 to that illustrated in Fig. 1, the rack bar 36 thus being turned out of engagement with the gear wheel 38 and the rack bar 37 into engagement with the gear wheel 39. Upon the next ascent of the frame 16, it being remembered that the carriage 26 becomes shifted laterally space by space at the end of each vertical movement of the frame 16, the arm 50 will pass closely along the left hand side of the depending arm 58 and this will result, when the carriage 26 is then shifted, in said arm 50 being moved to effect through the link 51 and lever arms 52 the turning of the rack bars 36, 37 from the relation to their gear wheels shown in Fig. 1 to that illustrated in Fig. 3, and thereupon said frame will be moved downwardly on a step-by-step movement by the engagement of the gear wheel 38 with the rack bar 36 and the fourth vertical column of impressions will have been taken. Since the frame 16 is placed in a proper initial position for impressions to be made on the first column of spaces on the sensitized plate or film sheet, said frame with the carriage 26 only makes three timed shifting movements toward the left, and the means for controlling and effecting these movements will now be described.

The spring 30 exerts a constant force to press the carriage 26 toward the left and against the respective stops 32, 33, 34, 35. The stop 35 is a permanent stop and is in the form of a standard secured to the bottom of the general casing 10. The stop 32 is an upwardly extending finger or bar located on a pivoted lever 59 which extends toward the left, looking at Fig. 1, and has its left hand end below a vertical rod 60 whose upper end is below a pivoted lever arm 61. The lever 59 is given an upward spring pressure against the lower end of the rod 60 by means of a coiled spring 62. Upon the frame 16 is provided an upwardly extending arm 63 and on the initial ascent of said frame said arm 63, when the frame is reaching its upper position, moves against the lever arm 61 and by elevating one end of said lever arm and depressing the other end against the rod 60, causes said rod to depress the lever 59 and thereby carry the stop 32 downwardly out of the path of the carriage 26, and at this time the spring 30 will move said carriage into engagement with the next adjacent stop 33. The stop 33 is on a lever 64, and this lever has a spring 65 below it pressing it upwardly so as to hold the stop 33 in position to arrest the carriage 26 when the latter is pressed against it by the spring 30. When the frame 16 has made its first ascent and displaced the stop 32 so that on the descent of said frame the second vertical column of impressions may be taken, said frame on its then descent carries an arm 66 secured thereto downwardly against the lever 64, and by depressing said lever moves the stop 33 downwardly out of the path of the carriage 26, and at this time the spring 30 shifts the carriage 26 to and against the stop 34, so that upon the next ascent of the frame 16 the third vertical column of impressions may be taken on the sensitized plate or film sheet. Upon the frame 16 ascending to take the third vertical column of impressions the arm 63 will be carried against a lever arm 67 and cause the same to depress a vertical rod 68 against the left hand end of the lever 69 carrying said stop 34, thereby depressing said lever and displacing said stop 34 from the path of the carriage 26, whereupon the spring 30 will move said carriage against the final stationary stop 35 so that upon the succeeding descent of the frame 16, the fourth vertical column of impressions may be taken. The rods 60, 68 correspond exactly with each other and upon each is placed a coiled spring 70 acting to press the rod upwardly. Below the lever 69 is placed a coiled spring 71 acting to press said lever at its left hand end against the lower end of the vertical rod 68 and maintain the stop 34 in its upper position shown in Fig. 1. The driving shaft 48 may be utilized also to operate the shutter 12, said shutter being of customary type and secured on a shaft 73 (Fig. 4) carrying a bevel gear wheel 74, which is in mesh with a bevel gear wheel 75 on a shaft 76 connected by a gear-belt, sprocket-chain or the like 77 with the driving shaft 48. By means of the connections just described the rotation of the shaft 48 is communicated to the shutter 72, which performs its customary duty.

The operation of the invention will be understood from the detailed description hereinbefore presented, and it will be understood that in accordance with my invention the sensitized plate or sheet film has predetermined sections thereof rapidly carried to and from the exposure opening of the camera so that a series of consecutive pictures of an object in motion may be secured. I have described the best means known to me at this time for securing the vertical step-by-step movements of the sensitized plate or sheet-film and also the lateral movements of said plate or film, but I do not wish to limit my invention to all of the details of mechanism illustrated and hereinbefore described, since I am aware that changes may be made in such mechanism, without departing from the spirit of my invention, for attaining the special movements hereinbefore pointed out as being imparted to the sensitized plate or film. After the camera has been used as a camera and the impressions developed, it may be used as a projector, the lamp and lens 18 then being detached from the bracket 19 and applied to the bracket at the opening 9 in the door 17. In the use of the camera as a projector, the developed plates or films will be applied to the frame 16 and the shaft 48 rotated for moving the pictures in consecutive order to and across the exposure opening of the camera, the dark slide used to protect the sensitized plate or film when taking pictures, being omitted when the camera is used as a projector, so that the light from the projecting lamp may act through the rectangular opening, shown in Figs. 1 and 3, in the frame 16. My claims are, therefore, to be understood as applying to the apparatus hereinbefore described whether the same be used as a camera or as a projector.

What I claim as my invention and desire to secure by Letters Patent, is:

1. In a device of the class described, a frame for supporting a sensitized plate or sheet film, means for imparting to said frame predetermined step by step movements in one direction, said means comprising a rack, gear, and Geneva stop mechanism, said rack being shiftable laterally into and out of mesh with said gear, and mechanism for so shifting said rack and operating automatically through the movement of said frame.

2. In a device of the class described, a frame for supporting a sensitized plate or sheet film, means for imparting to said frame predetermined step by step movements in one direction, said means comprising a rack, gear, and Geneva stop mechanism, said rack being mounted to swing angularly into and out of mesh with said gear, and mechanism controlled by the movement of said frame for so shifting said rack.

3. In a device of the class described, a frame for supporting a sensitized plate or sheet film, means for imparting to said frame predetermined step by step movements and comprising a train of gears including Geneva stop mechanism, and a rack carried by said frame and shiftable laterally into and out of mesh with one of the gears of said train.

4. In a device of the class described, a frame for supporting a sensitized plate or sheet film, means for imparting to said frame predetermined step by step movements and comprising a train of gears including Geneva stop mechanism, a pair of parallel racks carried by said frame and each being shiftable laterally into and out of operative relation with said gear train, mechanism connecting said racks for shifting said racks alternately into operative relation with said gear train, and means controlled by said frame for actuating said rack shifting mechanism.

5. In a device of the class described, a frame for supporting a sensitized plate or sheet film, a carriage supporting said frame, mechanism including Geneva stop members interposed between said frame and carriage for shifting said frame step by step in one direction on said carriage and comprising a pair of racks carried by said frame and laterally shiftable thereon to bring them alternately into place for moving said frame in respectively opposite directions, means normally urging said carriage in a direction transverse to the direction of movement of said frame thereon, a series of stops limiting said transverse movement, and means actuated through the movement of said frame for successively retracting said stops.

6. In a device of the class described, a frame for supporting a sensitized plate or sheet film, a carriage supporting said frame, means for imparting to said frame predetermined step by step movements in one direction and in the reverse direction relatively to said carriage, means normally urging said carriage in a direction transverse to the general direction of said step by step movements, a retractable stop normally positioned to arrest said transverse shifting of said carriage, and means located in the path of movement of said frame for withdrawing said stop.

7. In a device of the class described, a frame for supporting a sensitized plate or sheet film, a carriage supporting said frame, means for imparting to said frame predetermined step by step movements in one direction and in the reverse direction relatively to said carriage, means normally urging said carriage in a direction transverse to the general direction of said step by step movements, a series of limit stops located along the path of said carriage, and means located adjacent to the opposite limits of the movement of said frame on said carriage for successively retracting said stops when said frame reaches the respective limits of its movement on said carriage.

8. In a motion picture-machine, a frame for supporting a sensitized plate or sheet film, means for imparting to said frame predetermined step-by-step movements in one direction and in the reverse direction relatively to the exposure opening of the machine, and means for shifting said frame at the end of each of said complete movements so that sections of the plate or film along definite columns may be presented to exposure position, said shifting means comprising a series of stops, a spring acting against said frame to press it in a direction against said stops, and means operable by said frame at the end of each of its complete movements for displacing said stops one after another.

9. In a motion picture-machine, a frame for supporting a sensitized plate or sheet-film, means for imparting to said frame predetermined step-by-step vertical and lateral movements relatively to the exposure opening of the machine, and means without the machine for operating said frame-actuating means, the means for imparting movements to said frame along one direction and controlling said movements, comprising a spring normally acting to move said frame, a series of stops arranged at predetermined intervals to arrest said frame, and means operable by said frame when completing its other movements to displace said stops and permit said spring to shift said frame from one stop to another in series.

Signed at New York city, in the county of New York and State of New York, this 31st day of July A. D. 1914.

EDWIN L. OPPENHEIMER.

Witnesses:
 ARTHUR MARION,
 CHAS. C. GILL.